Oct. 6, 1964     C. MORGAN     3,151,907
SUNSHADE ASSEMBLY FOR A VEHICLE BODY
Filed Sept. 10, 1962
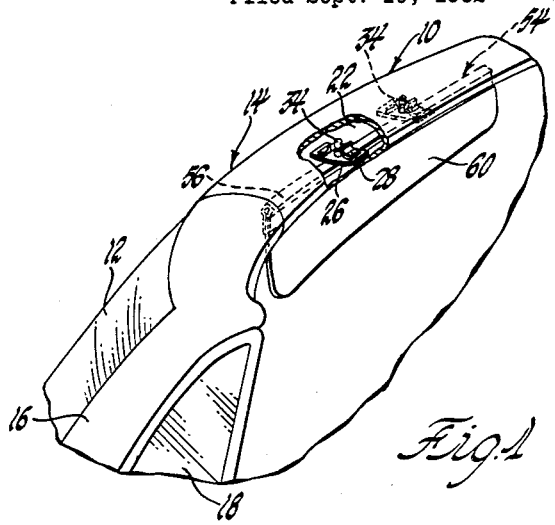
Fig. 1
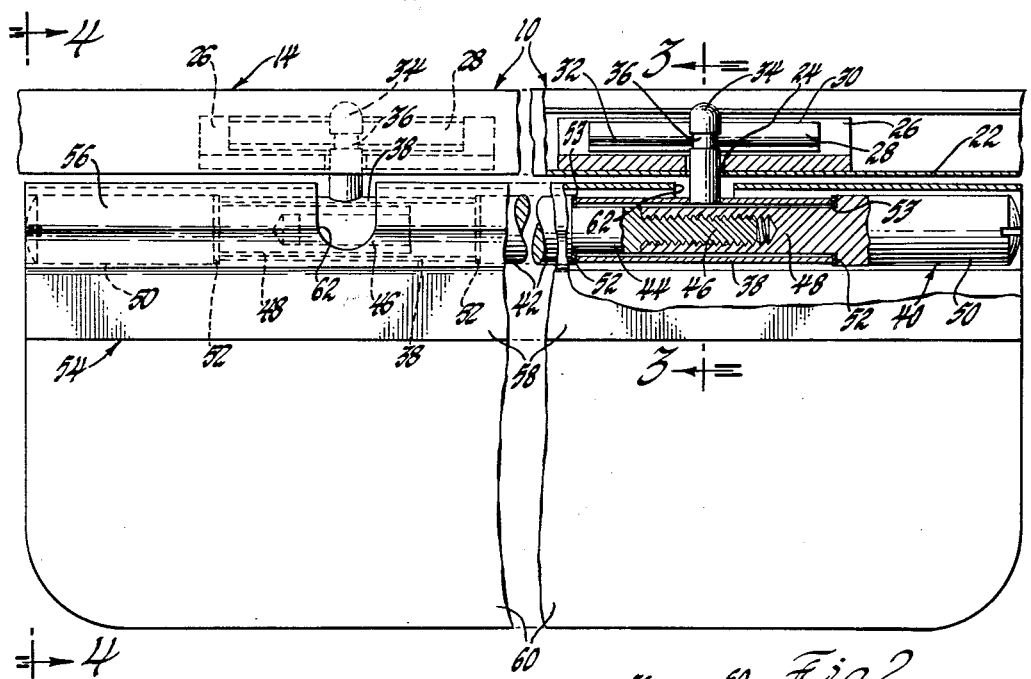
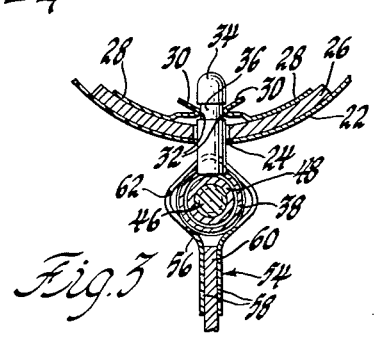
Fig. 3
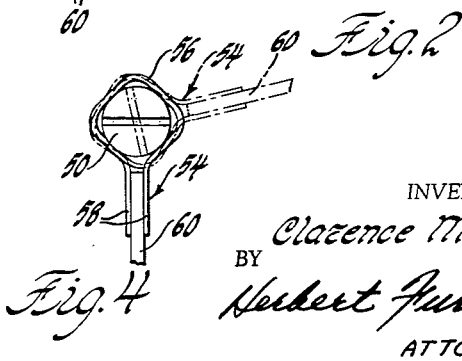
Fig. 2
Fig. 4
INVENTOR.
Clarence Morgan
BY Herbert Furman
ATTORNEY

United States Patent Office 3,151,907
Patented Oct. 6, 1964

3,151,907
SUNSHADE ASSEMBLY FOR A VEHICLE BODY
Clarence Morgan, Warren, Mich., assignor to General Motors Corporation, Detroit, Mich., a corporation of Delaware
Filed Sept. 10, 1962, Ser. No. 222,333
2 Claims. (Cl. 296—97)

This invention relates to sunshade assemblies and more particularly to vehicle body sunshade assemblies.

One feature of this invention is that it provides an improved vehicle body sunshade assembly. Another feature of this invention is that it provides an improved vehicle body sunshade assembly which may be bodily moved to a plurality of predetermined locations on the body. A further feature of this invention is that it provides an improved sunshade assembly for vehicle bodies which may be releasably secured to the body at a plurality of predetermined locations thereon.

These and other features and advantages of this invention will be readily apparent from the following specification and drawings wherein:

FIGURE 1 is a partial perspective view of a vehicle body having a sunshade assembly according to this invention mounted thereon;

FIGURE 2 is an enlarged partially broken away view of a portion of FIGURE 1;

FIGURE 3 is a sectional view taken generally along the plane indicated by line 3—3 of FIGURE 2, and FIGURE 4 is a view taken generally along the plane indicated by line 4—4 of FIGURE 2.

Referring now particularly to FIGURE 1 of the drawings, a convertible type vehicle body 10 includes a windshield 12, the upper edge portion of which is housed within a windshield or body header 14 and the side edge portions of which are housed within pillar assemblies 16. The front passenger compartment of the body is opened and closed by a pair of swingable front doors, not shown, each of which includes a lower door portion and an upper door window portion which is opened and closed by a swingable ventilation window 18 and a vertically movable door window, not shown.

The lower wall 22, FIGURES 2 and 3, of header 14 is provided with a pair of like spaced openings 24. Each opening is reinforced by an apertured plate member 26 which conforms to the shape of the inner surface of wall 22, with the opening in the plate member being aligned with the opening 24 in wall 22. As best shown in FIGURE 3, a pair of spring clip members 28 are secured to the plate member on diametrically opposite sides of the opening therein. Each clip member includes a return bent portion 30, with the bights or juncture ribs 32 between the return bent portions 30 and the bodies of the clips defining a restricted opening coaxial with the opening 24 in the header and the opening in the plate member 26.

A pair of spaced plugs or mounting members 34 are adapted to be received within the pair of openings 24, with each plug 34 being provided with a reduced portion 36 which receives the ribs 32 of the pairs of spring clip members so as to releasably secure the plug 34 in place.

The lower end of each plug 34 is threadedly or otherwise secured to a sleeve 38. The spaced sleeves 38 rotatably support a sunshade support rod assembly 40 which in turn mounts the sunshade, so that the sunshade and assembly 40 are rotatable as a unit relative to the sleeves 38 to an infinite number of positions of adjustment with respect thereto. The assembly 40 generally includes a center cylindrical member 42 provided with a pair of extensions 44 of reduced diameter. The extensions 44 are each provided with a threaded extension 46 which is of further reduced diameter and is received within a tapped opening provided in a reduced diameter extension 48 of an end member 50. Extensions 48 are of the same diameter as extensions 44, and each pair of assembled extensions 44, 48 is freely rotatably received within a sleeve 38. A pair of friction washers 52 seat between the ends of the sleeve 38 and the shoulders 53 and provide a friction clutch arrangement between each sleeve 38 and the center member 42 and an end member 50. The friction between each sleeve 38 and the assembly 40 may be adjusted by threading the end members 50 inwardly and outwardly with respect to the center member 42.

A sunshade hanger member 54 includes an upper tubular portion 56 of generally rectangular shape which fits over the support rod assembly 40 and the sleeves 38, with the flat sides of this tubular portion frictionally gripping the member 42 and each of the members 50. The depending flanges 58 of hanger 54 receive the sunshade 60 therebetween and are suitably secured to the sunshade such as by staples or otherwise. The tubular portion 56 is further provided with a pair of closed slots 62 so that the plugs 34 may project outwardly therethrough. These slots are of sufficient length so as to permit greater than 180° adjustment of the sunshade 60 relative to the sleeves 38.

When it is desired to adjust the sunshade 60, the sunshade is grasped and the sunshade, the hanger 56 and the support rod assembly 40 are rotated as a unit relative to the spaced pair of sleeves 38. If the resistance to movement is too great, or if the sunshade is not held in its adjusted position, the end members 50 are threadedly adjusted with respect to the center member 42 to thereby adjust the friction between the assembly 40 and the sleeves 38.

The sunshade may be easily removed from the header by pulling the sunshade downwardly with respect to the header 14 to thereby release the plugs 34 from the spring clips 28. Although, only one pair of spaced openings 24 is shown in the header 14, additional pairs of openings will be provided, with the spacing between the openings of each pair being equal to the distance between the center lines of the plugs 34. Each pair of openings 24 provides a predetermined location of the sunshade on the body.

Although the invention has been shown and described in conjunction with a convertible type vehicle body, it is equally applicable to the closed type of vehicle body wherein a roof rail or side window header extends over the door windows of the automobile. Such header may be provided with as many pairs of openings as desired so that the sunshade can be positioned at the side of the driver or passenger as well as in front of the driver or passenger.

Thus, this invention provides a new and improved sunshade assembly for vehicle bodies.

What is claimed is:

1. The combination comprising, a vehicle body including a body header with a plurality of spaced openings therein, a sunshade assembly including a sunshade support tube and a sunshade secured thereto, a support member rotatably mounted within said tube, a plug-in member secured to said support member and projecting through an opening in said tube so as to be receivable in a selected one of said header openings, with the opening in said tube permitting rotation of said tube relative to said plug-in member, means on said header releasably securing said plug-in member to said header to releasably secure said sunshade assembly to said body, and coacting means on said support member and said tube for adjustably fixing the rotative position of said tube relative to said support member.

2. The combination recited in claim 1 wherein said coacting means includes an adjusting member threadably mounted on said tube for adjustment relative to said support member, and a friction element interposed between said adjusting member and said support member to provide variable friction against rotation of said tube relative to said support member.

References Cited in the file of this patent

UNITED STATES PATENTS

| | | |
|---|---|---|
| 1,200,223 | Nathan | Oct. 3, 1916 |
| 1,535,810 | Brey | Apr. 28, 1925 |
| 1,781,545 | Groenenstein | Nov. 11, 1930 |
| 2,296,130 | Westrope | Sept. 15, 1942 |
| 2,360,183 | Westrope | Oct. 10, 1944 |
| 2,500,694 | Matsumato | Mar. 14, 1950 |
| 3,059,961 | Jacobs | Oct. 23, 1962 |

FOREIGN PATENTS

| | | |
|---|---|---|
| 103,263 | Australia | Feb. 14, 1938 |
| 470,896 | Canada | Jan. 16, 1951 |